(12) United States Patent
Fiutak et al.

(10) Patent No.: US 10,125,458 B2
(45) Date of Patent: Nov. 13, 2018

(54) MODULAR ENGINEERED WOOD COMPOSITE ROAD

(71) Applicant: Anthony Hardwood Composites, Inc., Sheridan, AR (US)

(72) Inventors: Jon C. Fiutak, Cape Elizabeth, ME (US); Toby Q. Edwards, Bryant, AK (US)

(73) Assignee: Anthony Hardwood Composites, Inc., Sheridan, AR (US)

( * ) Notice: Subject to any disclaimer, the term of this patent is extended or adjusted under 35 U.S.C. 154(b) by 2 days.

(21) Appl. No.: 15/535,624

(22) PCT Filed: Sep. 21, 2016

(86) PCT No.: PCT/US2016/052860
§ 371 (c)(1),
(2) Date: Jun. 13, 2017

(87) PCT Pub. No.: WO2017/053410
PCT Pub. Date: Mar. 30, 2017

(65) Prior Publication Data
US 2017/0370052 A1 Dec. 28, 2017

Related U.S. Application Data

(60) Provisional application No. 62/221,270, filed on Sep. 21, 2015.

(51) Int. Cl.
*E01C 19/52* (2006.01)
*B32B 3/10* (2006.01)
(Continued)

(52) U.S. Cl.
CPC ............... *E01C 19/52* (2013.01); *B27N 1/00* (2013.01); *B32B 3/06* (2013.01); *B32B 3/10* (2013.01);
(Continued)

(58) Field of Classification Search
CPC . E01C 19/52; E01C 5/14; E01C 5/223; E01C 9/00; E01C 11/16
See application file for complete search history.

(56) References Cited

U.S. PATENT DOCUMENTS 64,959 A * 5/1867 Fayette ............... E01C 5/14
404/46
1,648,431 A * 11/1927 Warmoth ............ E01C 5/14
404/56
(Continued)

FOREIGN PATENT DOCUMENTS

CA 2743529 A1 9/2012
CN 2547712 Y 4/2003

OTHER PUBLICATIONS

PCT International Search Report and Written Opinion, Application No. PCT/US16/52860, dated Dec. 13, 2016.

*Primary Examiner* — Abigail A Risic
(74) *Attorney, Agent, or Firm* — MacMillan, Sobanski & Todd, LLC

(57) ABSTRACT

A method of making a modular engineered wood composite road (40) includes determining a bearing strength of the soil at a location where the modular engineered wood composite road will be installed; determining a bearing strength of the soil at a location where a modular engineered wood composite road (40) will be installed; determining a flexural strength and stiffness required for the modular engineered wood composite road (40) based on the determined bearing strength of the soil at the location where the modular engineered wood composite road (40) will be installed; assembling a plurality of engineered wood composite billets (46) from a plurality of composite wood laminations, wherein each engineered wood composite billet (46) has the required flexural strength and stiffness; and assembling the (Continued)

engineered wood composite billets (46) to define the modular engineered wood composite road (40).

20 Claims, 13 Drawing Sheets

(51) Int. Cl.
    *E01C 5/14*     (2006.01)
    *B27N 1/00*     (2006.01)
    *E01C 9/08*     (2006.01)
    *B32B 7/08*     (2006.01)
    *B32B 21/13*     (2006.01)
    *B32B 3/06*     (2006.01)
    *B32B 3/26*     (2006.01)

(52) U.S. Cl.
    CPC ............... *B32B 3/266* (2013.01); *B32B 7/08* (2013.01); *B32B 21/13* (2013.01); *E01C 5/14* (2013.01); *E01C 9/086* (2013.01); *B32B 2307/546* (2013.01); *B32B 2607/00* (2013.01)

(56) References Cited

U.S. PATENT DOCUMENTS

| | | | | |
|---|---|---|---|---|
| 1,935,823 A * | 11/1933 | Turner | ............... | E01C 5/14 404/46 |
| 2,094,571 A * | 9/1937 | Fischer | ............... | E01C 5/14 404/40 |
| 2,335,556 A * | 11/1943 | Wilson | ............... | E01C 5/14 404/36 |
| 5,082,393 A | 1/1992 | Ringesten et al. | | |
| 5,139,845 A | 8/1992 | Beckerman et al. | | |
| 5,201,601 A * | 4/1993 | Stanley | ............... | E01C 5/14 404/35 |
| 5,701,716 A | 12/1997 | Thoss | | |
| 8,906,480 B2 | 12/2014 | Fiutak et al. | | |
| 2002/0122954 A1 | 9/2002 | Dagher | | |
| 2015/0239507 A1* | 8/2015 | Padmanabhan | ...... | B62D 25/2054 296/184.1 |
| 2016/0134031 A1* | 5/2016 | Klein | ............... | E01C 5/003 174/6 |
| 2016/0186386 A1* | 6/2016 | Althaus | ............... | E01C 9/086 428/99 |
| 2017/0145639 A1* | 5/2017 | Sterling | ............... | E01C 9/086 |

* cited by examiner

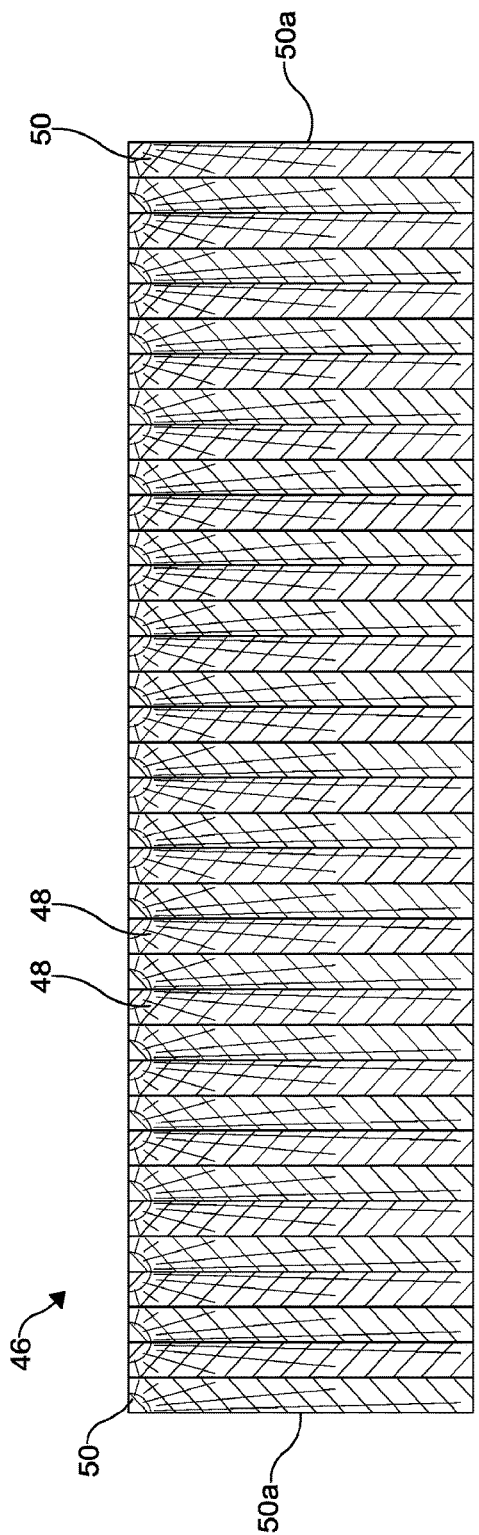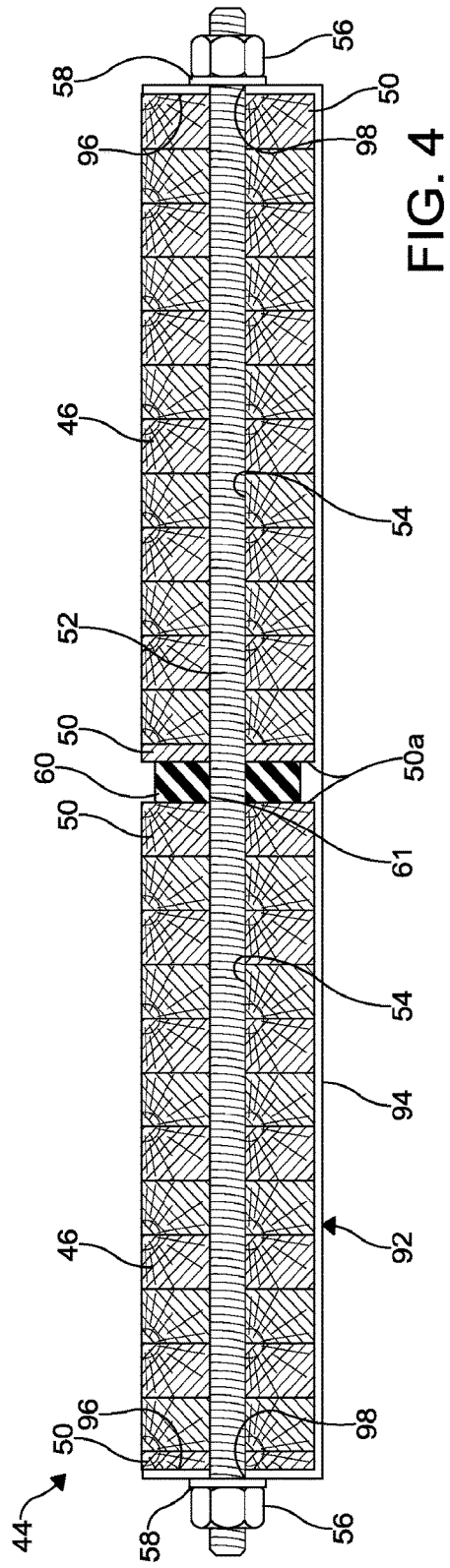

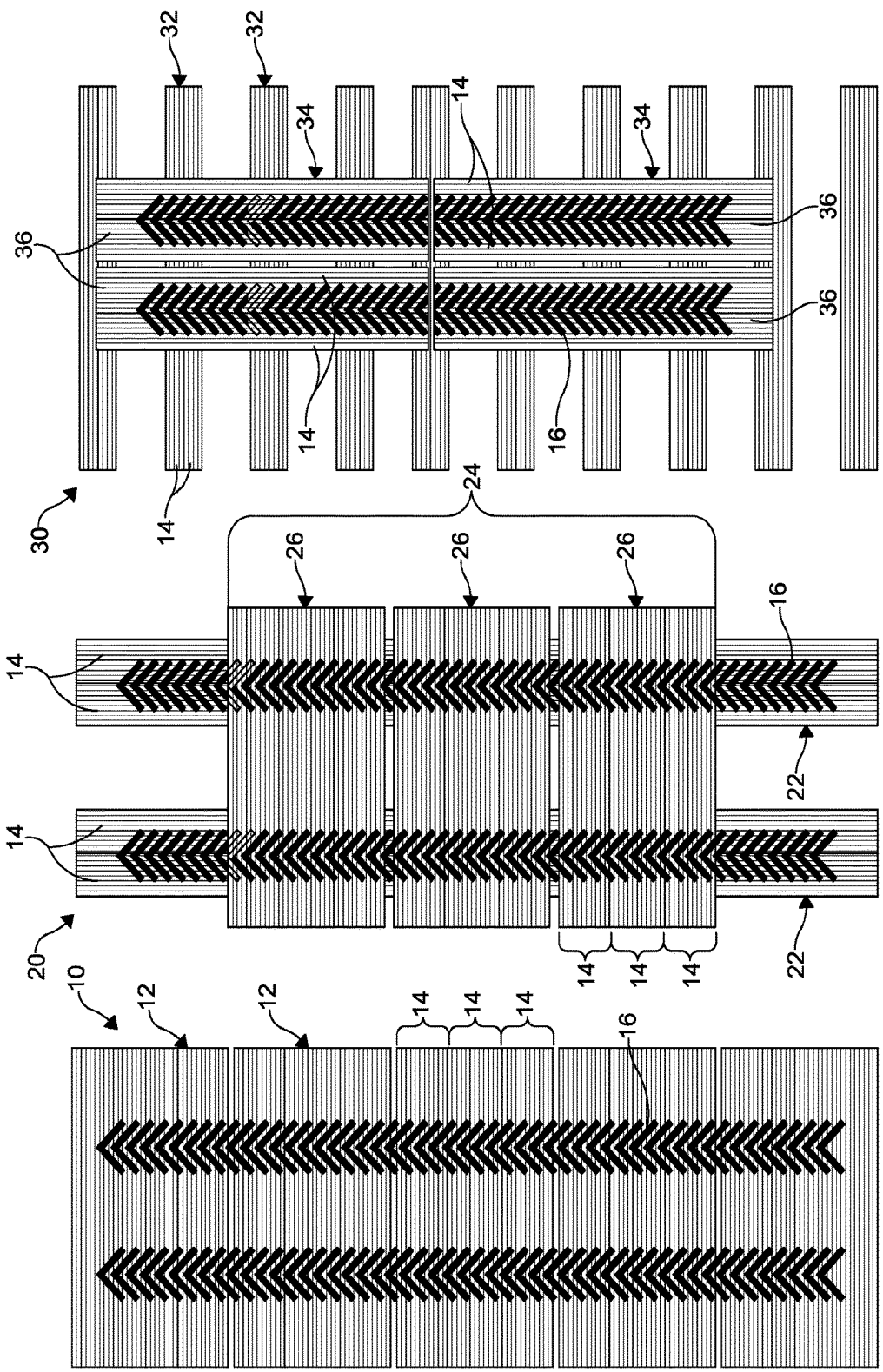

MODULAR ENGINEERED WOOD COMPOSITE ROAD

BACKGROUND OF THE INVENTION

This invention relates in general to wooden roads for use in rural areas. In particular, this invention relates to an improved modular engineered wood composite road for use in rural areas wherein the load bearing capability of the modular engineered wood composite road may be selected based on the environment within which the modular engineered wood composite road will be deployed and upon the maximum load of vehicles that will travel on the deployed modular engineered wood composite road.

Throughout history, rural and remote communities around the world have desired reliable roads that connect with other established lines of communication, such as improved and/or paved roads, railroads, and commercial waterways, and thus allow these communities to reach markets. The transportation of food, consumer goods, humanitarian aid, and education are critical components to a developing nation, but remote villages can be isolated from desired food, consumer goods, humanitarian aid, and education because of incomplete infrastructure, especially the lack of reliable roads.

Natural resources and precious revenue generating commodities can be isolated from markets. Well developed infrastructure may be under-used because the link to production is broken. Roads needed to link remote villages to all-weather transportation routes may only need to be a few kilometers long. To mitigate these challenges and to provide a life-line for isolated communities, rural connecting roads are needed.

Proper construction and maintenance are critical to develop the needed reliable transportation routes, but standard road construction methods may not be effective. For example, environmental conditions may not support standard road construction methods, and challenging or problematic site conditions, such as excessively wet conditions, may require unique construction methods.

Although wood has a long tradition as a road construction material to link rural communities in developing regions, it would be desirable to provide an improved engineered wood composite road that is modular, and thus relatively easy to both ship and assemble, and wherein the strength of the modular engineered wood composite road may be tailored such that its load bearing capability may be selected based on the environment within which the modular engineered wood composite road will be deployed, and upon the maximum load that will travel on the deployed modular engineered wood composite road.

SUMMARY OF THE INVENTION

This invention relates to improved Type II and Type III modular engineered wood composite roads for use in rural areas wherein the load bearing capability of the modular engineered wood composite road may be selected based on the known material properties of billets from which the road will be assembled, the environment within which the modular engineered wood composite road will be deployed, and upon the maximum load that will travel on the deployed modular engineered wood composite road. In one embodiment, a method of making a modular engineered wood composite road includes determining a bearing strength of the soil at a location where the modular engineered wood composite road will be installed; determining a flexural strength and stiffness required for the modular engineered wood composite road based on the determined bearing strength of the soil at the location where the modular engineered wood composite road will be installed; assembling a plurality of engineered wood composite billets from a plurality of composite wood laminations, wherein each engineered wood composite billet has the required flexural strength and stiffness; and assembling the engineered wood composite billets to define the modular engineered wood composite road.

In a second embodiment, a method of making a modular engineered wood composite road includes determining a bearing strength of the soil at a location where a modular engineered wood composite road will be installed; determining a flexural strength and stiffness required for the modular engineered wood composite road based on the determined bearing strength of the soil at the location where the modular engineered wood composite road will be installed; assembling a plurality of engineered wood composite billets from a plurality of composite wood laminations, wherein each engineered wood composite billet has the required flexural strength and stiffness; disposing a plurality of timbers on the ground and oriented substantially perpendicularly to a direction of traffic flow of vehicles that will travel on the modular engineered wood composite road; and attaching the engineered wood composite billets to the plurality of timbers to define a modular engineered wood composite road.

Various aspects of this invention will become apparent to those skilled in the art from the following detailed description of the preferred embodiment, when read in light of the accompanying drawings.

BRIEF DESCRIPTION OF THE DRAWINGS

FIG. 3 is an end view of a billet illustrated in FIGS. 1 and 2.

FIG. 4 is a cross-sectional view of a runner taken along the line 4-4 in FIG. 2.

FIG. 11 is a plan view of a known Type I mat arrangement.

FIG. 12 is a plan view of a known Type II mat arrangement.

FIG. 13 is a plan view of a known Type III mat arrangement.

DETAILED DESCRIPTION OF THE PREFERRED EMBODIMENTS

Figure 1:
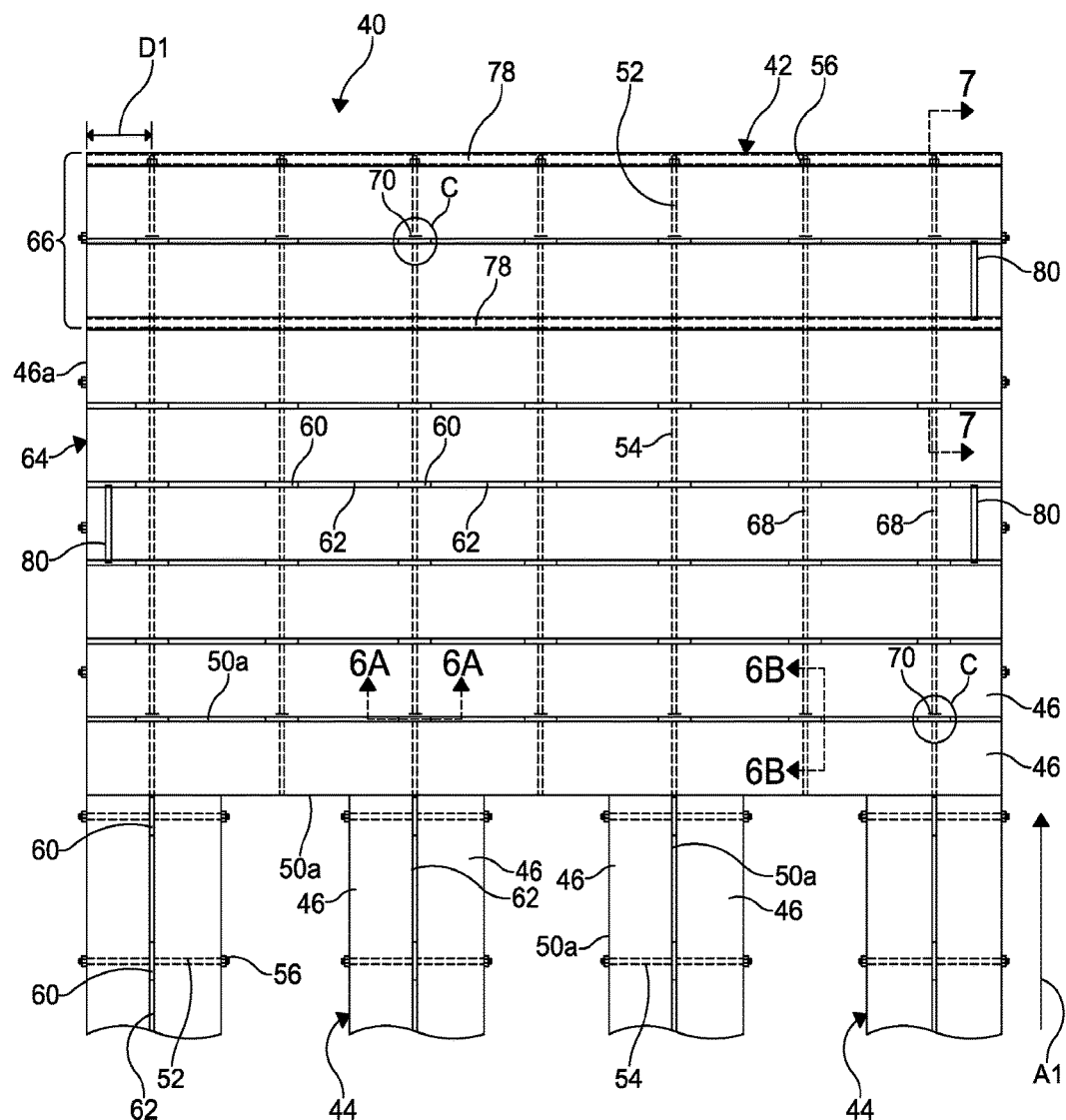
FIG. 1 is a plan view of a portion of an improved Type II modular engineered wood composite road according to this invention.
Figure 2:
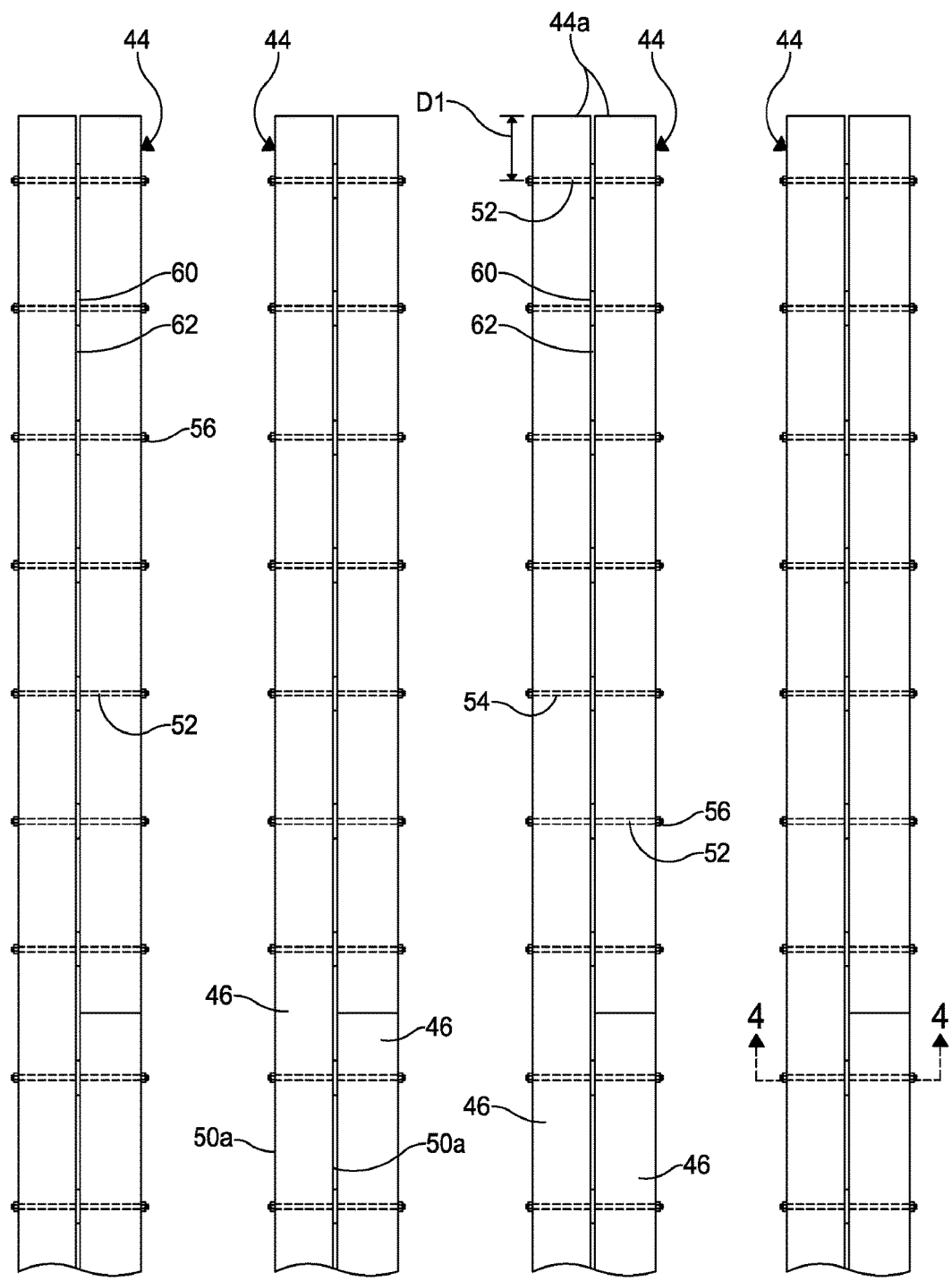
FIG. 2 is a plan view of the runners illustrated in FIG. 1.

Referring now to FIGS. 1 and 2, a section of an improved Type II modular engineered wood composite road according to the invention is shown generally at 40. The improved modular engineered wood composite road 40 includes decking 42 mounted to a plurality of runners 44 in a manner described below in detail.

Although load bearing mats and temporary roads for access to, and use in, undeveloped areas such as construction sites are known, conventional mats used in such applications are typically made from wood or wood composites and are typically deployed in a work site using one of three techniques or mat arrangements, known as Type I, Type II, and Type III arrangements. A contractor using the conventional mats may choose between the Type I, Type II, and Type III arrangements based on the soil conditions and the desired load bearing capability. However, because the specific strength properties of the materials used in the construction of the known Type I, Type II, and Type III arrangements, such as their flexural strength and stiffness, is not precisely known, the known Type I, Type II, and Type III arrangements are not designed for the measured or estimated bearing strength of the soil at a location where the known Type I, Type II, and Type III arrangements will be installed.

The wood laminations 48 and the engineered wood composite billets 46 made from the wood laminations 48 are unique in that both the wood laminations 48 and the engineered wood composite billets 46 can be designed to achieve a desired flexural strength and stiffness. Further, the bearing strength of the soil at a location where the improved Type II modular engineered wood composite road 40 will be installed may be measured or estimated. Thus, the improved Type II modular engineered wood composite road 40 may be designed, manufactured, and/or its components selected to have a specific flexural strength and stiffness required for the bearing strength of the soil upon which the modular engineered wood composite road 40 will be installed, and required for the load that will be supported by the improved Type II modular engineered wood composite road 40.

A Type I mat arrangement is shown at 10 in FIG. 11, and includes one or more mats 12. Each mat 12 is comprised of a plurality of billets 14. Each billet 14 is comprised of a plurality of wood members (not shown in FIG. 1). The Type I mat arrangement 10 is typically used on job sites in which the mats 12 are simply laid directly on the ground perpendicularly to the direction of traffic flow, as indicated by the chevrons 16. The Type I mat arrangement 10 is typically used when the site conditions are generally uniform so that the mat or mats 14 can lay substantially flat on the ground.

A Type II mat arrangement is shown at 20 in FIG. 12, and includes two components: two or more stringers 22 and decking 24 comprising a plurality of mats 26. Each stringer 22 and each mat 26 is comprised of a plurality of the billets 14. The Type II mat arrangement 20 is typically used on job sites that have non-uniform site conditions. Such a job site may have high and low spots that may be one or two feet apart, and the site may have varying soil strength. The stringers 22 are positioned to bridge across the terrain variations and the decking 24 provides a solid road surface. The stringers 22 are laid parallel to the direction of traffic flow, as indicated by the chevrons 16, and the mats 26 of the decking 24 are laid on the stringers 22 perpendicular to the direction of traffic flow.

A Type III mat arrangement is shown at 30 in FIG. 13, and includes two components: two or more bars 32 and a plurality of runners 34 comprising plurality of mats 36. Each bar 32 and each mat 36 is comprised of a plurality of the billets 14. The Type III mat arrangement 30 is typically used on job sites that have extremely poor soil conditions. Typically, such poor soil conditions mean that it is very difficult to walk across the job site, and foot access may require the use of hip-waders. Such a job site may also be described as one in which a Type I mat arrangement 10 would generally become submerged under typical equipment loads. The bars 32 are positioned perpendicularly to the direction of traffic flow, as indicated by the chevrons 16, and further positioned to cover a relatively large area to develop enough support to distribute typical equipment loads. The runners 34 are laid on the bars 32 parallel to the direction of traffic flow.

As shown in FIG. 1, the runners 44 are positioned substantially parallel to the direction of traffic flow, as indicated by the arrow A1, and the decking 42 is laid on the runners 44 substantially perpendicularly to the runners 44 and to the direction of traffic flow. As shown in FIGS. 1 and 2, the decking 42 and the runners 44 each comprise a plurality of billets 46, as shown in FIGS. 3 and 4. In the illustrated embodiment, the billets 46 are an engineered wood composite product formed from a plurality of composite wood laminations 48 (see FIG. 3). Examples of such billets, and of methods of making such billets, are disclosed in U.S. Pat. Nos. 7,137,226, 7,818,929, and 8,906,480, the disclosures of which are incorporated herein by reference in their entireties. In general, the process of manufacturing the billet 46 begins by machining rough hardwood boards to a desired dimension for laminating. The boards are first ripped to a width that will ultimately yield the billet thickness. The top and bottom longitudinally extending wide faces of the ripped boards are surfaced to define the laminations 48 and to prepare and define uniform surfaces for laminating. Adhesive is then applied to each lamination 48. Each lamination 48 is set on edge and nested into a lay-up with others laminations 48 to create an un-pressed billet. The lay-up is then moved into a press, where the lay-up is pressed using heat and pressure to define the billet 46. The pressed billets are further machined to achieve the desired billet dimensions. Connection hardware, described below, may then be attached to the billets 46. Each billet 46 includes outboard laminations 50 (see FIG. 3).

The billets 46 may have any desired dimensions as disclosed in U.S. Pat. Nos. 7,137,226, 7,818,929, and 8,906,480. In the illustrated embodiment, and as best shown in FIG. 3, the billets 46 have a height of about 3.5 inches (89 mm) and a width of about 12 inches (30.5 cm). The billets 46 configured to form the runners 44 may have a length of about 28 feet (8.5 m) and the billets 46 configured to form the decking 42 have a length of about 14 feet (4.27 m). Alternatively, the billets 46 may have any desired length determined by the needs of a road project.

Referring to FIGS. 2 and 4, the runners 44 may be formed by attaching together two of the billets 46. The billets 46 may be arranged side by side such that wide faces 50*a* of the outboard laminations 50 of the adjacent billets 46 face each other.

The billets 46 of the runners 44 may then be attached together by rigid rods 52 having nuts 56 and washers 58, as best shown in FIG. 4, threaded onto the distal ends thereof. The rods 52 extend through apertures 54 formed transversely through the billets 46. The rods 52 nearest distal ends 44*a* of the runners 44 may be spaced a distance D1 of about 12 inches (30.5 cm) from the distal ends 44*a*, and the remaining rods 52 may be spaced about 2 feet (61.0 cm) apart. It will be understood that any number of the rods 52 may be used to attach the billets 46 together, and that the rods 52 may be spaced any desired distance apart. The nuts 56 may be tightened to urge the billets 46 together to define the runner 44.

Figure 5B:
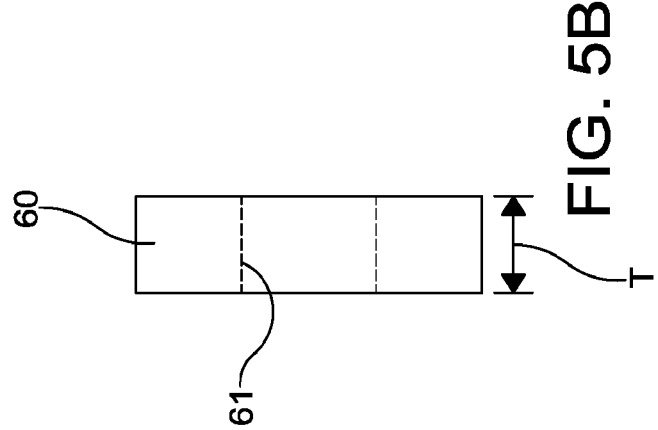
FIG. 5B is a side view of the spacer illustrated in FIGS. 1, 2 and 5A.
Figure 5A:
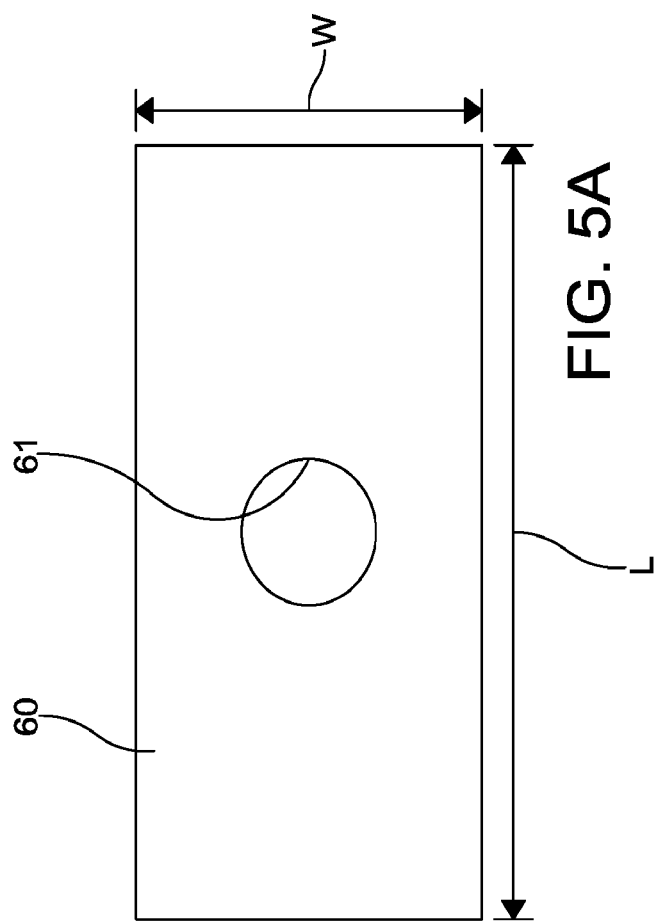
FIG. 5A is a plan view of a spacer illustrated in FIGS. 1 and 2.

If desired, expansion pads or spacers 60 (see FIGS. 5A and 5B) may be mounted between the adjacent billets 46, centered on each of the rods 52, such that the rods 52 extend through an aperture 61 formed in each spacer 60. The spacers 60 are therefore also spaced about 2 feet (61.0 cm) apart. The illustrated spacers 60 are formed from rubber, although other elastomeric and resilient materials may be used. The spacers 60 may have any desired dimensions as disclosed in U.S. Pat. Nos. 7,818,929 and 8,906,480. In the illustrated embodiment, and as best shown in FIGS. 5A and 5B, the spacers 60 have a length L of about 6.0 inches (15.2 cm), a width W of about 3.0 inches (7.6 cm), and a thickness T of about 0.75 inches (19 mm). With the spacers 60 mounted between adjacent billets 46, a plurality of elongated slots 62 are defined between the adjacent billets 46 and between the spacers 60.

Figure 7:
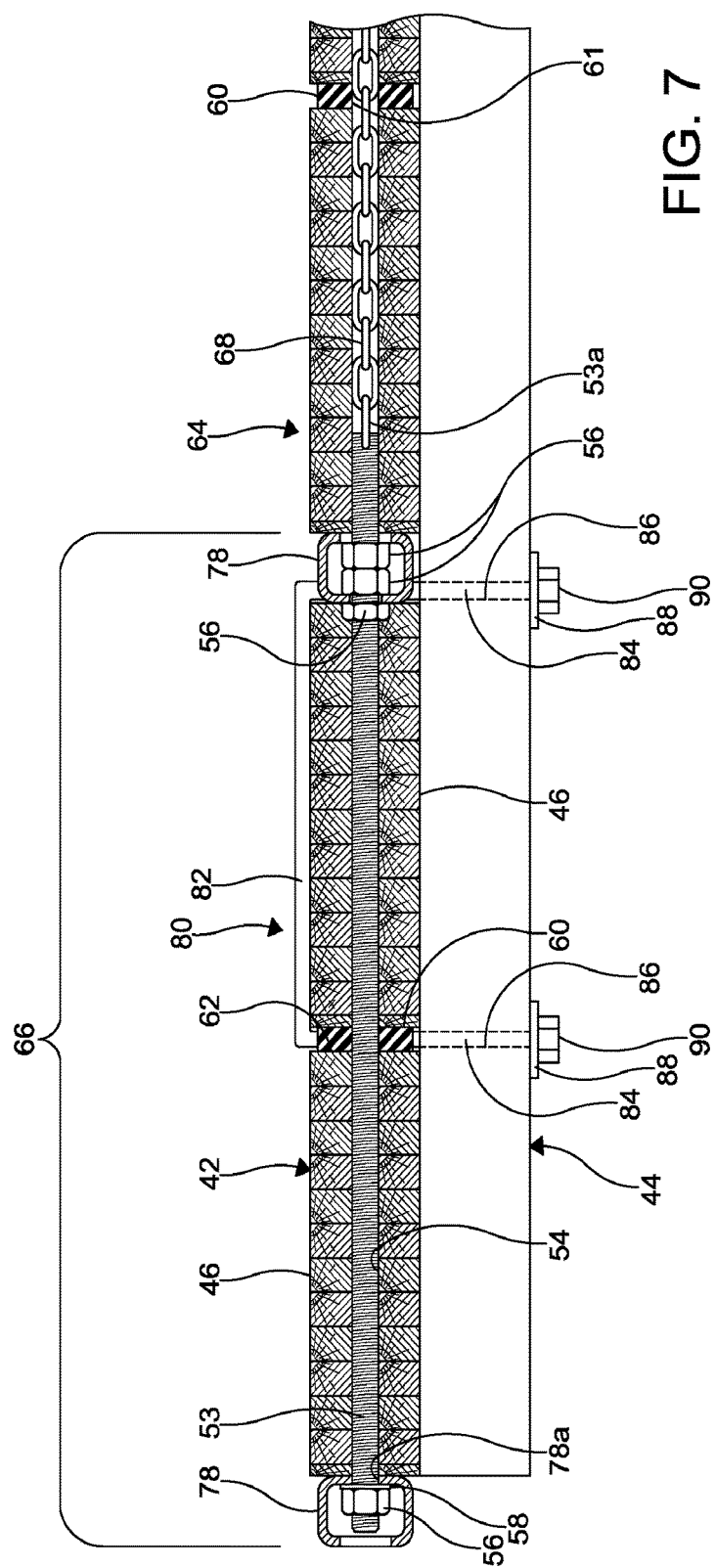
FIG. 7 is a cross-sectional view of a portion of the modular engineered wood composite road taken along the line 7-7 of FIG. 1.

Referring again to FIGS. 1 and 7, the decking 42 includes a central portion 64 and two leading/trailing end portions 66. It will be understood however, that only a portion of the modular engineered wood composite road 40 is shown and therefore only one of the two leading/trailing end portions 66 is shown in FIGS. 1 and 7. Like the runners 44, the central portion 64 of the decking 42 includes a plurality of the billets 46 arranged side by side such that wide faces 50*a* of the outboard laminations 50 of the adjacent billets 46 face each other.

Unlike the billets 46 of the runners 44, the billets 46 of the central portion 64 are attached together by lengths of chain 68 that extend through the apertures 54 formed transversely through the billets 46. The lengths of chain 68 nearest distal ends 46*a* of the billets 46 that comprise the central portion 64 are spaced a distance D1 of about 12 inches (30.5 cm) from the distal ends 46*a*, and the remaining lengths of chain 68 are spaced about 2 feet (61.0 cm) apart. It will be understood that any number of the lengths of chain 68 may be used to attach the billets 46 of the central portion 64 together, and that the lengths of chain 68 may be spaced any desired distance apart. The spacers 60 are mounted between the adjacent billets 46 of the central portion 64, centered on each of the lengths of chain 68, such that the lengths of chain 68 extend through the aperture 61 formed in each spacer 60.

It will be further understood that any desired number of billets 46 may comprise the central portion 64. An L-clip 70 may be provided on each length of chain 68 as described below, and/or on each rod 52 in the leading/trailing end portions 66.

Figure 6A:
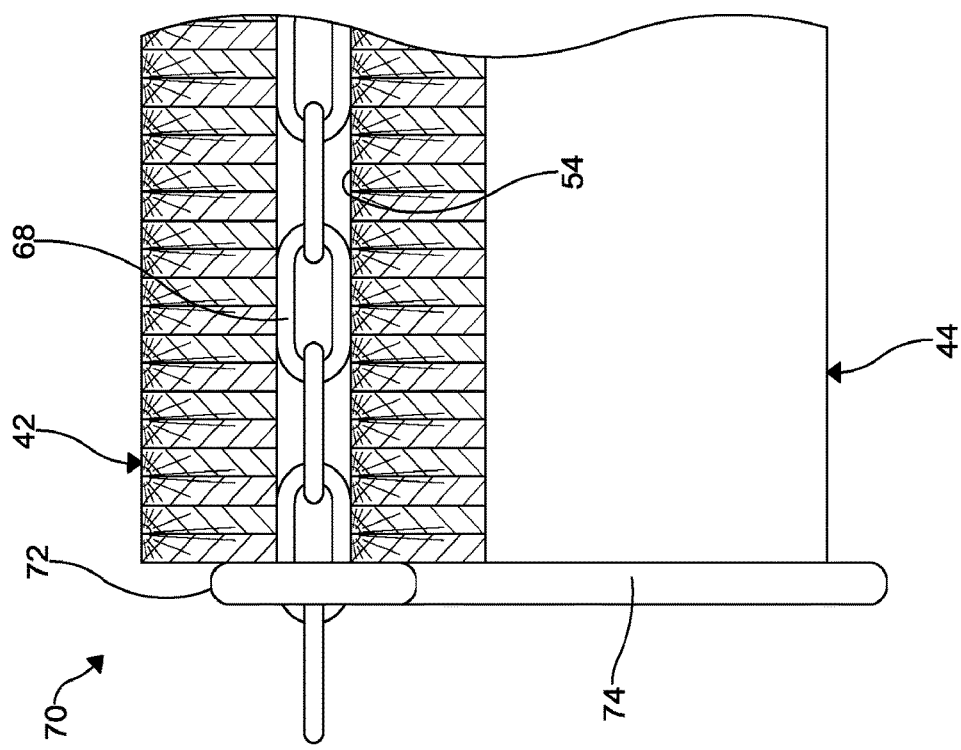
FIG. 6A is a cross-sectional view of a portion of the modular engineered wood composite road taken along the line 6A-6A of FIG. 1.
Figure 6B:
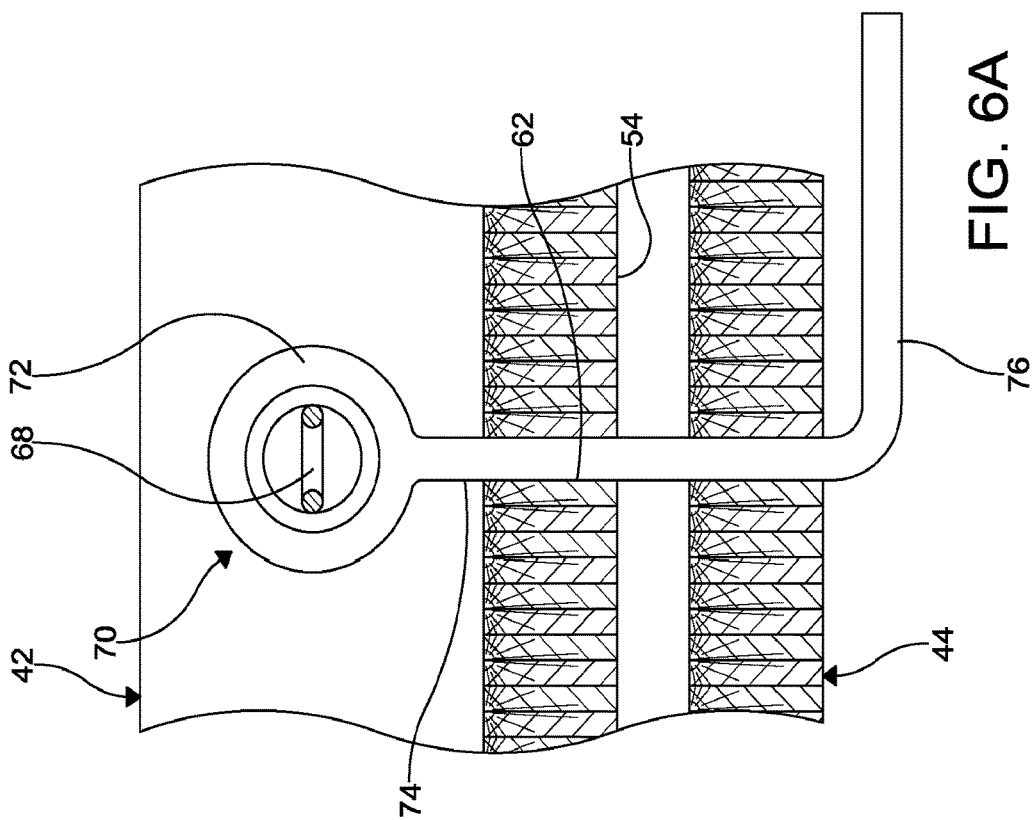
FIG. 6B is a cross-sectional view of a portion of the modular engineered wood composite road taken along the line 6B-6B of FIG. 1.

As shown in FIGS. 6A and 6B, each L-clip 70 includes an eyelet 72 having a first leg 74 extending radially therefrom and a second leg 76 extending at about a 90 degree angle from the first leg 74. Alternatively, the second leg 76 may extend from the first leg 74 at any desired angle, such as within the range of about 80 degrees to about 100 degrees. The eyelet 72 is configured such that the distal ends of the lengths of chain 68 may extend therethrough. The illustrated first leg 74 has a length of about 4.81 inches (12.2 cm) and the illustrated second leg 76 has a length of about 4.375 inches (11.1 cm). The illustrated L-clip 70 has diameter of about 0.375 inches (9.5 mm) and is formed from a rigid material, such as steel. Alternatively, the L-clip may be of any size suitable for the size of the billets 46 being used.

The L-clips 70 may be provided at any desired location on the lengths of chain 68, such as shown within the circles C in FIG. 1. As shown in FIG. 1, the L-clips 70 are positioned on each length of chain between the billets 46 of the leading/trailing end portions 66, and then every seventh billet 46 of the central portion 64, such that the L-clips 70 are about 6.0 feet (1.83 m) apart.

The illustrated decking 42 includes the two leading/trailing end portions 66, only one of which is shown in FIG. 7. The leading/trailing end portions 66 are mounted to the leading and trailing ends of the central portion 64. Each leading/trailing end portion 66 is formed in a manner similar to each runner 44. Each leading/trailing end portion 66 is formed by attaching together two of the billets 46 with rigid rods 53 having the nuts 56 and the washers 58 threaded onto the distal ends thereof. The rods 53 have a length longer than an assembled width of the leading/trailing end portion 66, such as about 10 inches (25.4 cm) longer, extend through apertures 54, and are spaced apart as described above. The illustrated rods 53 include a hook 53*a* at an inboard end thereof (see FIGS. 7 and 9). The purpose for the hook 53*a* will be described below.

Figure 8:
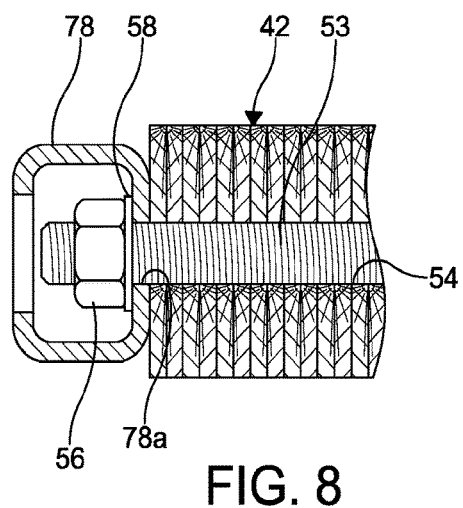
FIG. 8 is an enlarge view of a first portion of the modular engineered wood composite road illustrated in FIG. 7.
Figure 9:
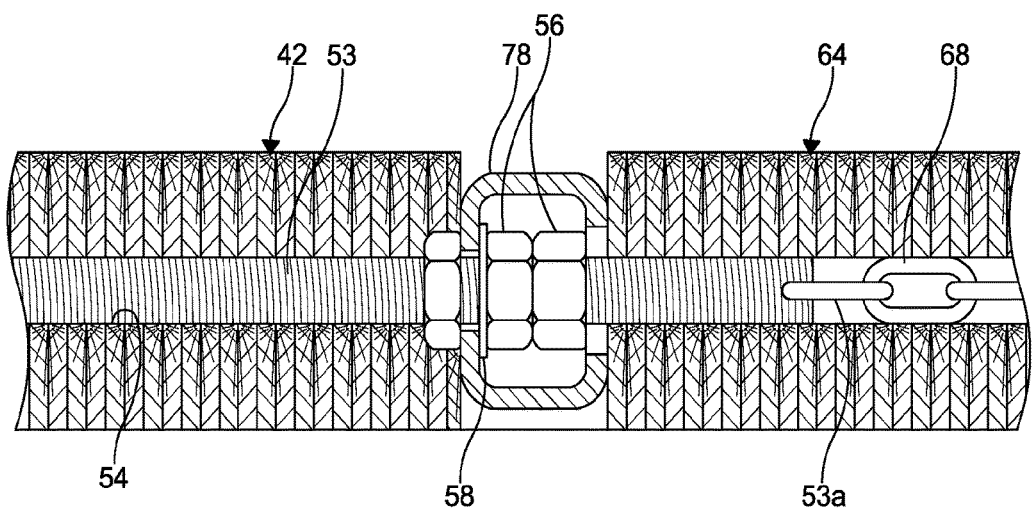
FIG. 9 is an enlarge view of a second portion of the modular engineered wood composite road illustrated in FIG. 7.

Elongated protective edge members 78 may be attached to the outboard laminations 50 of the outboard billets 46 of the leading/trailing end portions 66 as shown in FIG. 1. The protective edge members 78 include first or rod apertures 78*a* and second or tool apertures 78*b* configured such that a tool, such as wrench, may be inserted therethrough. As best shown in FIGS. 7 through 9, the rigid rods 53 extend through the rod apertures 78*a* in the protective edge members 78 and are attached to the leading/trailing end portions 66 by one or more nut 56.

Figure 10:
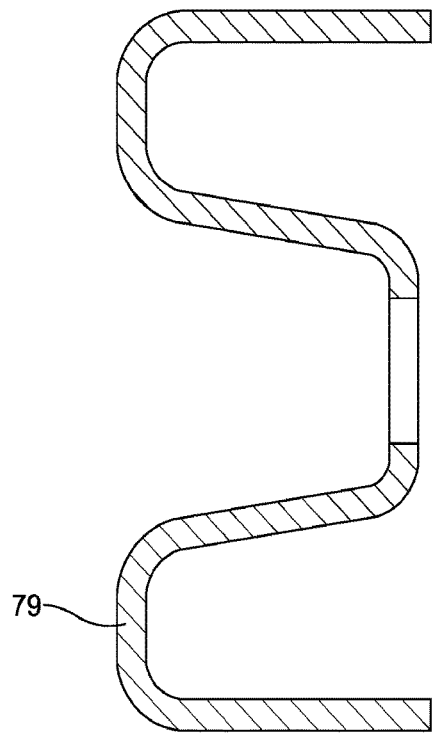
FIG. 10 is a cross-sectional view of an alternate embodiment of protective edge member illustrated in FIGS. 1 and 7 through 9.

The illustrated protective edge member 78 is formed from steel and has a substantially rectangular cross section. Alternatively, the protective edge member 78 may have other shapes, such as a substantially M-shaped cross section as shown at 79 in FIG. 10, and any of the shapes described in U.S. Pat. No. 8,906,480. In the illustrated embodiments, the protective edge members 78 have a length of about 4.0 feet (1.22 m). Alternatively, the protective edge members 78 may have lengths of less than about 4.0 feet (1.22 m) and greater than about 4.0 feet (1.22 m).

To assemble the leading/trailing end portions 66, the hooks 53*a* of the rods 53 are extended into the apertures 54 of the billets 46 of the central portion 64, and connected to a leading link in the length of chain 68. The leading/trailing end portions 66 are then assembled onto the rods 53. For example, one or more of the nuts 56, a first one of the protective edge members 78, a first billet 46, the spacers 60, a second billet 46, a second one of the protective edge members 78, and a nut 56 are then sequentially assembled together to define the leading/trailing end portion 66. The nuts 56 may be tightened to urge the rods 53 away (to the left when viewing FIG. 7) from the lengths of chain 68, thus tightening the lengths of chain 68. The nuts 56 may be further tightened to urge the billets 46 of the leading/trailing end portion 66 together and to urge the leading/trailing end portion 66 toward the central portion 64.

When the decking 42 is assembled on top of the runners 44, the second leg 76 of the L-clips 70 are rotated about 90 degrees such that the second leg 76 is substantially parallel with a longitudinal axis of the runners 44. The second leg 76 is inserted into one of the slots 62 until the second leg 76 extends below the runner 44. The second leg 76 is again rotated about 90 degrees such that the second leg 76 is returned to its original position; i.e., substantially perpendicular to an axis of the runners 44. The L-clips 70 thus hold the decking 42 against the runners 44.

Referring to FIGS. 1 and 7, substantially U-shaped bolts 80 may be provided to attach the decking 42 to the runners 44 and to mitigate vibration that may occur when vehicles travel on the modular engineered wood composite road 40, especially when the modular engineered wood composite road 40, or a portion thereof, is deployed on surfaces having a grade above about 4%.

The U-shaped bolts 80 include a body 82 and two substantially parallel legs 84. The illustrated U-shaped bolts 80 are formed from ⅝ inch (1.6 cm) diameter rods. Alternatively, the U-shaped bolts 80 may be formed from rods having a diameter of less than about ⅝ inch (1.6 cm) and greater than about ⅝ inch (1.6 cm). The body 82 may have a length slightly larger than a width of the billets 46. The legs 84 of the U-shaped bolts 80 may be extended through the slots 62 between adjacent billets 46 and through holes 86 drilled or otherwise formed through the runners 44. The U-shaped bolts 80 may be secured to bottom surface of the runners 44 (i.e., the ground facing surface of the runners 44) with washers 88 and nuts 90.

Any number of U-shaped bolts 80 may be attached to the modular engineered wood composite road 40 and may be positioned as needed to mitigate vibration.

A plurality of straps 92 may be attached around the decking 42 and/or the runners 44 at the location of each rod 52. As shown in FIG. 4, the straps 92 include a body 94 and two substantially parallel legs 96. The legs 96 have rod apertures 98 formed therein. The straps 92 may be formed from flat steel or from other suitable metals and non-metals. In the illustrated embodiment, the straps 92 have a width of about 3.0 inches (7.62 cm), and a thickness of about 0.125 inches (3.18 mm). Alternatively, the straps 92 may have a width less than or greater than about 3.0 inches (7.62 cm), and a thickness less than or greater than about 0.125 inches (3.18 mm). The body 94 and the legs 96 of the illustrated straps 92 have lengths of about 24 inches (61.0 cm) and 3 inches (7.62 cm) respectively. It will be understood that the body 94 and the legs 96 may have any desired lengths determined by the size of the decking 42 and/or the runners 44 to which the straps 92 will be attached. As shown in FIG. 4, the ends of the rod 52 may be inserted through the apertures 98 prior to the washers 58 and the nuts 56 being installed and tightened.

The wood laminations 48 and the engineered wood composite billets 46 made from the wood laminations 48 are unique in that both the wood laminations 48 and the engineered wood composite billets 46 may be designed to achieve a desired flexural strength and stiffness. Further, the bearing strength of the soil at a location where the improved Type II modular engineered wood composite road 40 will be installed may be measured or estimated. Thus, the improved Type II modular engineered wood composite road 40 may be designed, manufactured, and/or its components selected to have a specific flexural strength and stiffness required for the bearing strength of the soil upon which the modular engineered wood composite road 40 will be installed, and required for the load that will be supported by the improved Type II modular engineered wood composite road 40. For example the improved Type II modular engineered wood composite road 40 may be manufactured to have a known axle load strength rating of at least about 8 tons (7258 kg). Alternatively, and depending on the bearing strength of the soil upon which the modular engineered wood composite road 40 will be installed, and on the load that will be supported thereon, the improved Type II modular engineered wood composite road 40 may also be manufactured to have a known axle load strength rating of less than about 8 tons (7258 kg) and greater than about 8 tons (7258 kg).

Advantageously, the improved Type II modular engineered wood composite road 40 may be manufactured anywhere in the world, packaged as disassembled billets 46 with the required associated hardware, such as the lengths of chain 68, the rods 52 and 53, the L-clips 70, the washers 58, and the nuts 56, and shipped to a remote or rural site at which the improved Type II modular engineered wood composite road 40 is required. At such a remote or rural job site, a team of minimally trained individuals may easily unpack the engineered wood composite billets 46 and the associated hardware, and assemble a desired length of the modular engineered wood composite road 40.

An apron (not shown) may be formed from stone or gravel and may be formed or installed along the longitudinally extending side edges of the modular engineered wood composite road 40. An underlayment (not shown) may also be disposed under the runners 44 and/or the apron, and may comprise overlapping sheets of material (not shown), such as 8 oz. non-woven geotextile material. Alternatively, other suitable non-woven and woven material may be used. The sheets of the underlayment may be overlapped as necessary to prevent or reduce soil migration. Additionally, the sheets of the underlayment may be placed loosely on the ground to allow the modular engineered wood composite road 40 to flex during use without tearing the sheets of the underlayment.

Figure 14:
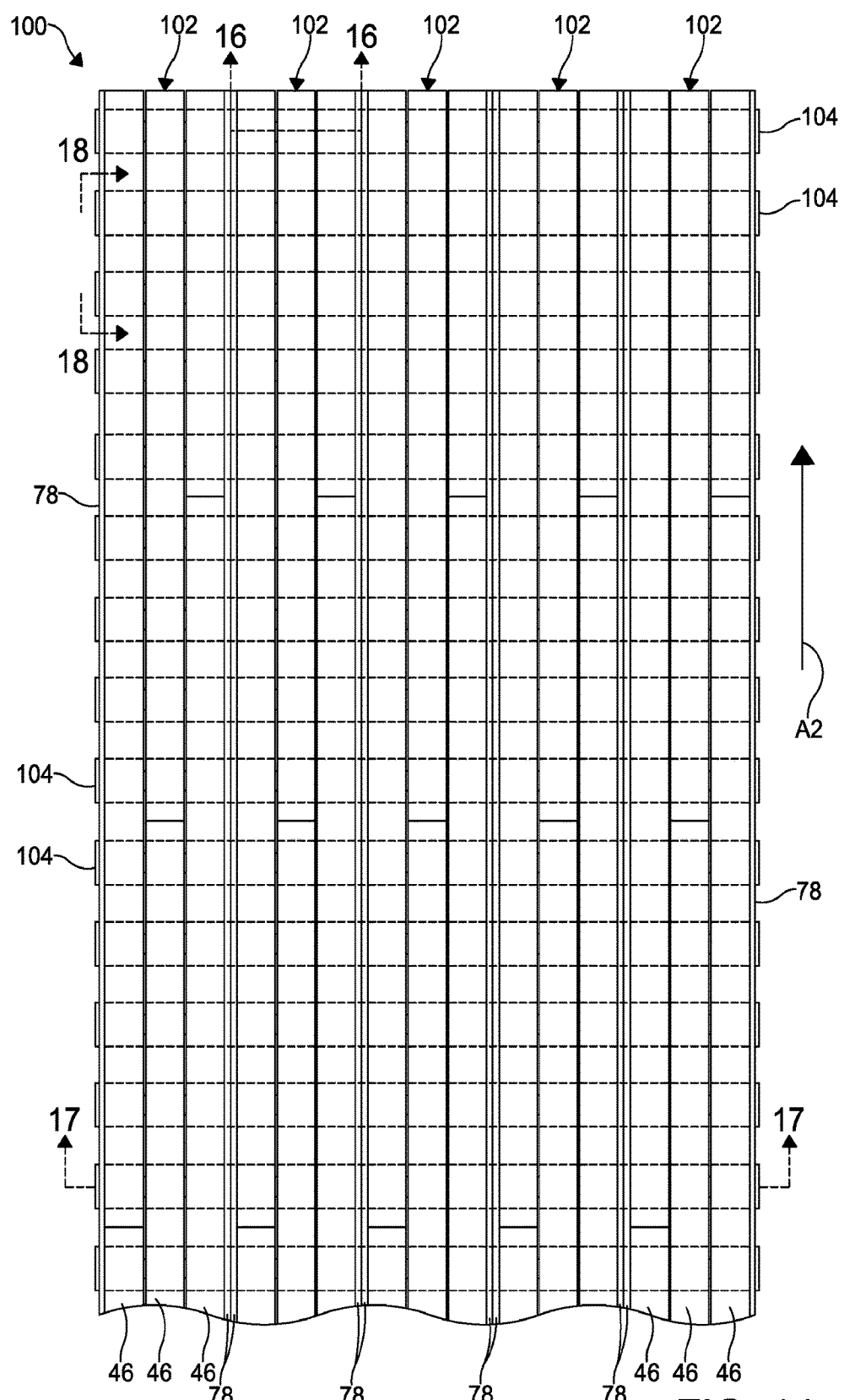
FIG. 14 is a plan view of a portion of an improved Type III modular engineered wood composite road according to this invention.
Figure 15:
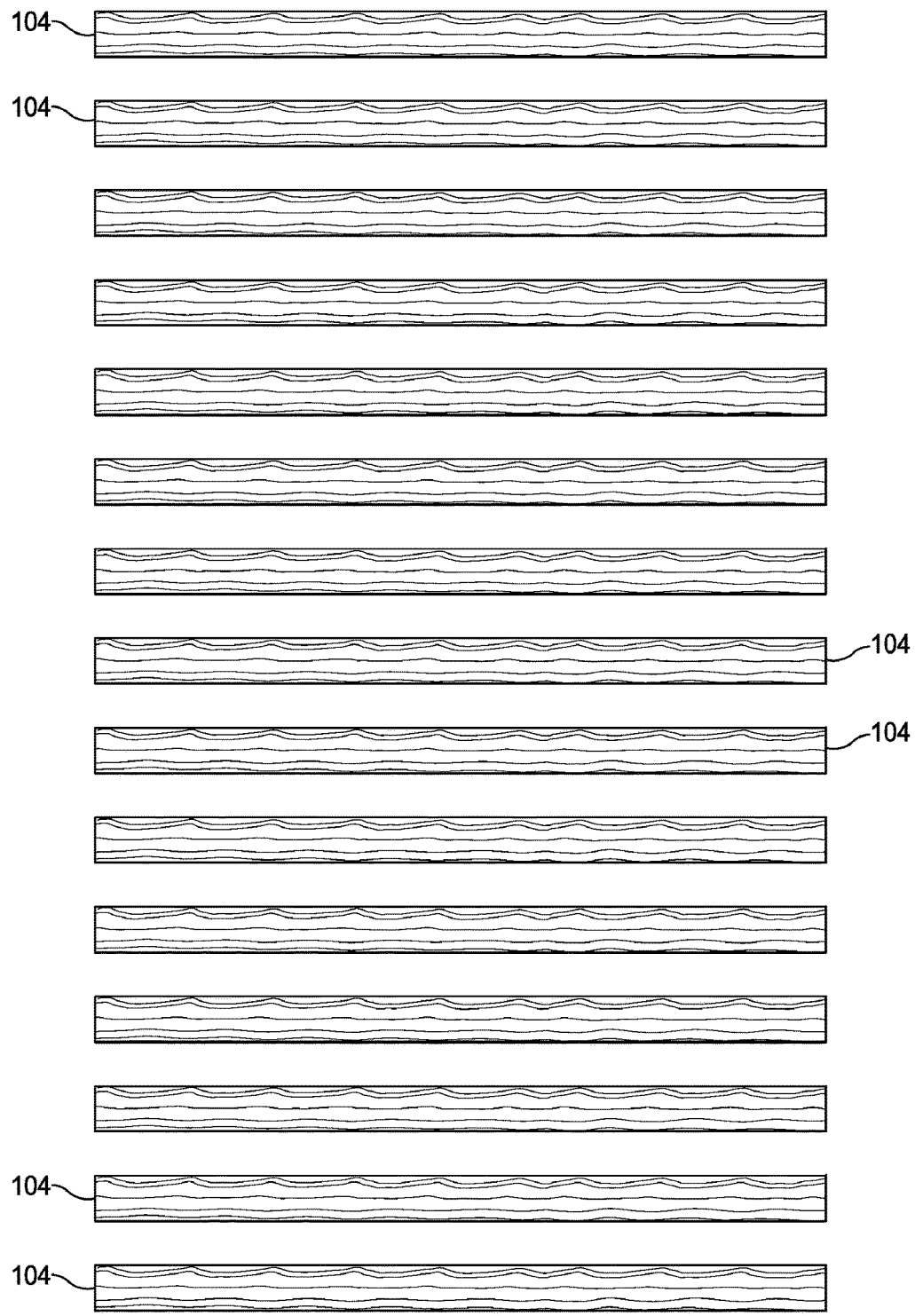
FIG. 15 is a plan view of the bars illustrated in FIG. 14.

Referring now to FIGS. 14 through 18, a section of an improved Type III modular engineered wood composite road according to the invention is shown generally at 100. The improved modular engineered wood composite road 100 includes a plurality of runners 102 mounted to a plurality of bars 104 in a manner described below in detail. As shown in FIG. 14, the bars 104 are positioned substantially perpendicularly to the direction of traffic flow, as indicated by the arrow A2, and the runners 102 are laid on the bars 104 substantially perpendicularly to the bars 104 and substantially parallel to the direction of traffic flow.

The illustrated bars 104 are formed from solid sawn timbers and have known design values for similar timbers used in vehicle platform or road applications. The bars 104 may be about 4 inches (10.2 cm)×about 12 inches (30.5 cm)×about 18.0 feet–½ inch (5.5 m), and may be spaced about 2.0 feet (60.1 cm) apart on-center. Alternatively, the bars 104 may be formed from the engineered wood composite product that comprise the billets 46, described above, and formed having any desired dimensions and known design values for such engineered wood composite billets 46.

Figure 16:
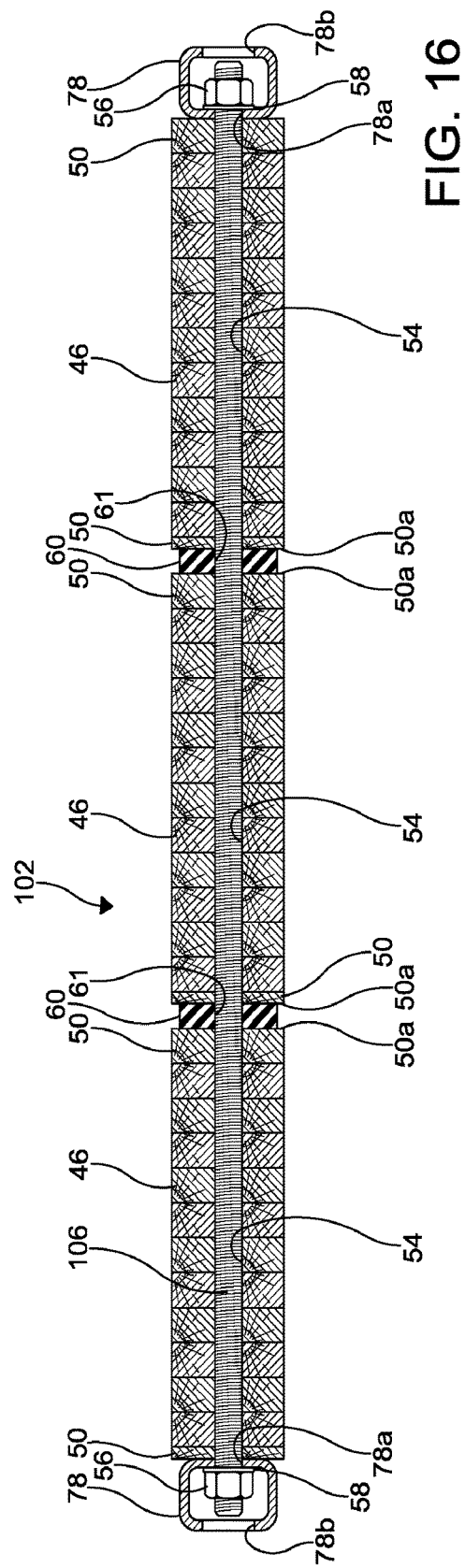
FIG. 16 is a cross-sectional view of a portion of the modular engineered wood composite road taken along the line 16-16 of FIG. 14.

As shown in FIG. 14, the runners 102 are formed from a plurality of the billets 46. The billets 46 configured to form the runners 102 may have a length of about 28 feet (8.5 m). Alternatively, the billets 102 may have any desired length determined by the needs of a road project. As shown in FIG. 16 each runner 102 may be formed by attaching together three of the billets 46. The billets 46 may be arranged side by side such that wide faces 50a of the outboard laminations 50 of the adjacent billets 46 face each other.

The elongated protective edge members 78 may be attached to the outboard laminations 50 of the outboard billets 46 of the runner 102 as shown in FIG. 16. The billets 46 of the runners 102 may then be attached together by rigid rods 106 having the nuts 56 and the washers 58 threaded onto the distal ends thereof. The rods 106 extend through apertures 54 formed transversely through the billets 46. It will be understood that any number of the rods 106 may be used to attach the billets 46 together, and that the rods 106 may be spaced any desired distance apart. As shown in FIG. 16, the rigid rods 106 also extend through the rod apertures 78a in the protective edge members 78 and are attached to the runner 106 by the nuts 56 and the washers 58. The nuts 56 may be tightened to urge the billets 46 together.

If desired, the spacers 60 (see FIGS. 5A and 5B) may be mounted between the adjacent billets 46, centered on each of the rods 106, such that the rods 106 extend through the aperture 61 formed in each spacer 60.

Figure 17:
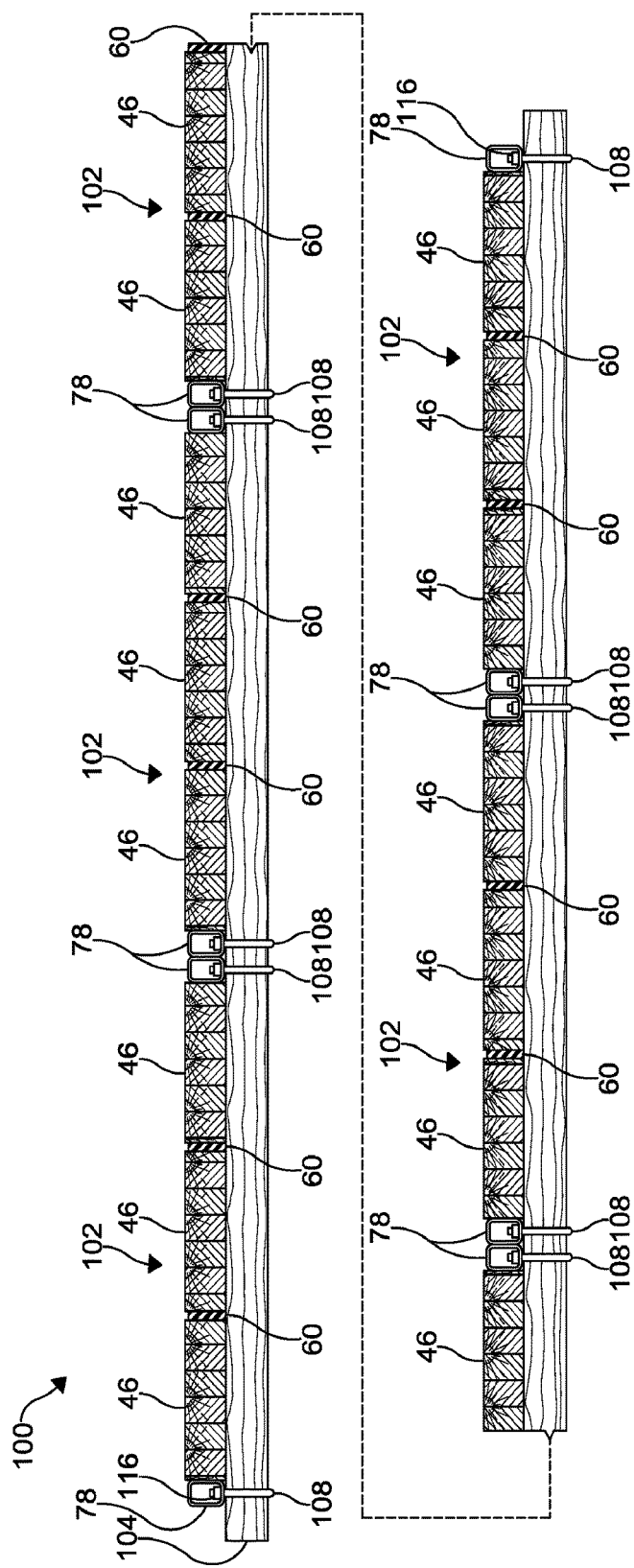
FIG. 17 is a cross-sectional view of a portion of the modular engineered wood composite road taken along the line 17-17 of FIG. 14.
Figure 18:
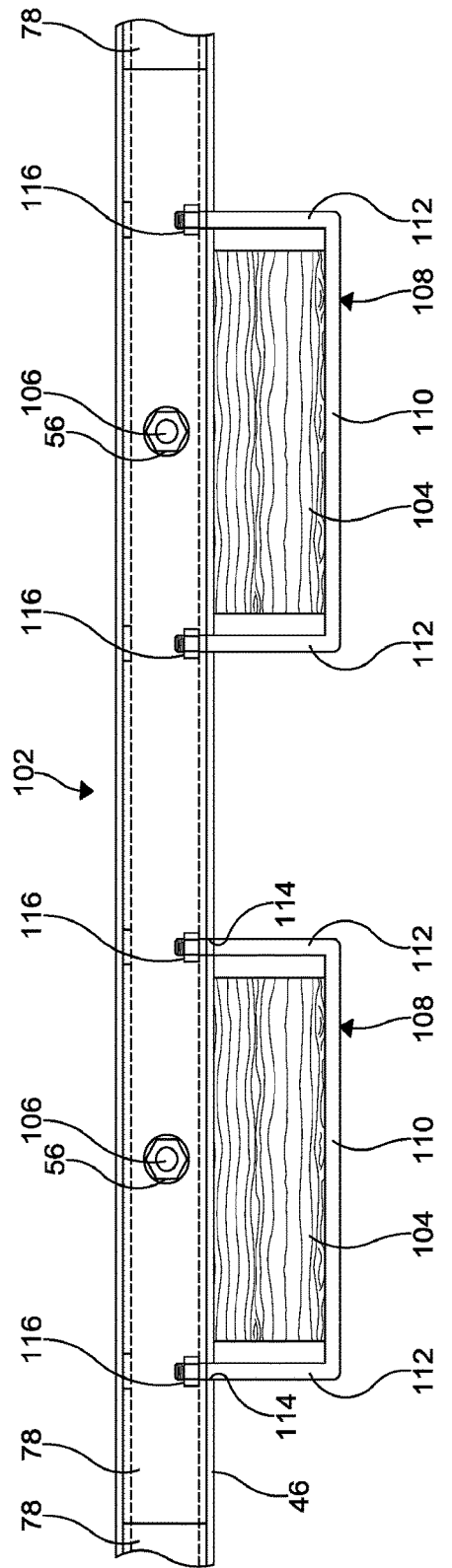
FIG. 18 is a cross-sectional view of a portion of the modular engineered wood composite road taken along the line 18-16 of FIG. 14.

Referring to FIGS. 17 and 18, substantially U-shaped bolts 108 may be provided to attach the runners 102 to the bars 104 and to mitigate vibration that may occur when vehicles travel on the modular engineered wood composite road 100, especially when the modular engineered wood composite road 100, or a portion thereof, is deployed on surfaces having a grade above about 4%.

The U-shaped bolts 108 include a body 110 and two substantially parallel legs 112. The illustrated U-shaped bolts 108 are formed from 0.5 inch (12.7 mm) diameter rods. Alternatively, the U-shaped bolts 108 may be formed from rods having a diameter of less than about 0.5 inch (12.7 mm) and greater than about 0.5 inch (12.7 mm). The body 110 may have a length slightly larger than a width of the billets 46. For example, the body 110 may have a length of about 14 inches (356 mm). The legs 112 of the U-shaped bolts 108 may be extended through U-bolt apertures 114 formed in a surface of the protective edge members 78 (the ground facing or downwardly facing surface when viewing FIGS. 17 and 18). The U-shaped bolts 108 may be secured to protective edge members 78 with nuts 116.

Any number of the U-shaped bolts 108 may be attached to the modular engineered wood composite road 100 and may be positioned as needed to secure the runners 102 to the bars 104 and to mitigate vibration.

In a deployed environment, the modular engineered wood composite road 100 is configured such that water, such as from rainfall, may easily flow between the bars 104 and underneath the runners 102. Advantageously, the thickness and width of the bars 104, and the distance between adjacent bars 104 may be varied based on the terrain and environmental factors, such as expected rainfall. Additionally, the modular engineered wood composite road 100 is configured such that its width may be adjusted by varying the number of runners 102 in the modular engineered wood composite road 100. For example, the illustrated modular engineered wood composite road 100 has five runners 102, but may be assembled with one to four runners 102, or with six or more runners 102.

As described above, an apron (not shown) may be formed from stone or gravel and may be formed or installed along the longitudinally extending side edges of the modular engineered wood composite road 100. An underlayment (not shown) may also be disposed under the runners 44 and/or the apron, and may comprise overlapping sheets of material (not shown), such as 8 oz. non-woven geotextile material. Alternatively, other suitable non-woven and woven material may be used. The sheets of the underlayment may be overlapped as necessary to prevent or reduce soil migration. Additionally, the sheets of the underlayment may be placed loosely on the ground to allow the modular engineered wood composite road 100 to flex during use without tearing the sheets of the underlayment.

Like the improved Type II modular engineered wood composite road 40, the wood laminations 48 and the engineered wood composite billets 46 in the improved Type III modular engineered wood composite road 100 may be designed to achieve a desired flexural strength and stiffness. Further, the bearing strength of the soil at a location where the improved Type III modular engineered wood composite road 100 will be installed may be measured or estimated. Thus, the improved Type III modular engineered wood composite road 100 may be designed, manufactured, and/or its components selected to have a specific flexural strength and stiffness required for the bearing strength of the soil upon which the modular engineered wood composite road 100 will be installed, and required for the load that will be supported by the improved Type III modular engineered wood composite road 100. For example the improved Type III modular engineered wood composite road 100 may be manufactured to have a known axle load strength rating of at least about 8 tons (7258 kg). Alternatively, and depending on the bearing strength of the soil upon which the modular engineered wood composite road 100 will be installed, and on the load that will be supported thereon, the improved Type III modular engineered wood composite road 100 may also be manufactured to have a known axle load strength rating of less than about 8 tons (7258 kg) and greater than about 8 tons (7258 kg).

Advantageously, the modular engineered wood composite roads 40 and 100 may be used together. For example, an improved modular engineered wood composite road may be assembled wherein one or more portions of the modular engineered wood composite road is the modular engineered wood composite road 40 and one or more portions of the modular engineered wood composite road is the modular engineered wood composite road 100.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of making a modular engineered wood composite road (40), the method comprising:
   determining a bearing strength of unexcavated soil at a location where a modular engineered wood composite road (40) will be installed;
   determining a flexural strength and stiffness required for the modular engineered wood composite road (40) based on the determined bearing strength of the unexcavated soil at the location where the modular engineered wood composite road (40) will be installed;
   assembling a plurality of engineered wood composite billets (46) from a plurality of composite wood laminations, wherein each engineered wood composite billet (46) has the required flexural strength and stiffness; and assembling the engineered wood composite billets (46) on a surface of the unexcavated soil to define the modular engineered wood composite road (40).

2. The method according to claim 1, wherein the assembled modular engineered wood composite road (40) has an axle load strength rating of at least about 8 tons (7258 kg).

3. The method according to claim 1, wherein the step of assembling the engineered wood composite billets (46) further includes assembling a runner including the steps of:
 disposing a plurality of spacers (60) between two of the engineered wood composite billets (46);
 disposing a strap (92) around a portion of the two of the engineered wood composite billets (46) at the locations of the spacers (60), wherein the strap (92) includes a body (94) and two substantially parallel legs (96), each leg having a rod aperture (98) formed therein;
 inserting a first rod (52) through a first one of the rod apertures (98), an aperture (54) formed transversely through a first one of the billets (46), an aperture (61) formed in the spacer (60), an aperture (54) formed transversely through a second one of the billets (46), and a second one of the rod apertures (98); and
 placing nuts (56) on distal ends of the first rod (52) and tightening the nuts (56) to form the runner (44).

4. The method according to claim 3, wherein the step of assembling the engineered wood composite billets (46) further includes assembling a central portion (64) of decking (42) for the modular engineered wood composite road (40) including the steps of:
 disposing a plurality of spacers (60) between adjacent ones of a plurality of the engineered wood composite billets (46);
 extending a length of chain (68) through apertures (54) formed transversely through the billets (46), and through apertures (61) formed in the spacers (60); and
 mounting at least one L-clip (70) on each length of chain (68), wherein the L-clip (70) includes an eyelet (72) having a first leg (74) extending radially therefrom and a second leg (76) extending at about a 90 degree angle from the first leg (74), the length of chain (68) extending through the eyelet (72).

5. The method according to claim 4, wherein the step of assembling the engineered wood composite billets (46) further includes assembling a leading/trailing edge portion (66) including the steps of:
 inserting a first end of a second rod (53) into the transversely formed aperture (54) in a first outboard one of the billets (46) of the central portion (64), the second rod (53) having a hook (53a) at the first end thereof, and connecting the hook (53a) to a leading link in the length of chain (68);
 assembling onto the second rod (53) one or more nuts (56), a first protective edge member (78), a first engineered wood composite billet (46), a spacer (60), a second engineered wood composite billet (46), a second protective edge member (78), and a nut (56), wherein the first and second protective edge members (78), the first and second engineered wood composite billets (46), the spacer (60), the second rod (53), and the nuts (56) define a leading/trailing end portion (66);
 tightening the nuts (56) to urge the second rod (53) away from the length of chain (68), thus tightening the length of chain (68), urging the first and second engineered wood composite billets (46) together, and urging the leading/trailing end portion (66) toward the central portion (64).

6. The method according to claim 5, further including inserting first ends of a plurality of the second rods (53) into a plurality of transversely formed apertures (54) in the outboard one of the billets, each transversely formed aperture (54) having a length of chain (68) extending therethrough, and each of the second rods (53) having a hook (53a) at the first ends thereof, and connecting the hooks (53a) to leading links in the lengths of chain (68).

7. The method according to claim 6, further including attaching a second one of the leading/trailing end portions (66) on a second outboard one of the billets (46) of the central portion (64), thereby defining decking (42) for the modular engineered wood composite road (40) having two of the leading/trailing end portions (66) with the central portion (64) therebetween.

8. The method according to claim 7, further including disposing a plurality of the runners (44) on the unexcavated soil and oriented substantially parallel to a direction of traffic flow of vehicles that will travel on the modular engineered wood composite road (40), and laying the decking (42) on the runners (44) substantially perpendicularly to the runners (44) such that the legs (74, 76) of the L-clips (70) extend through a slot (62) defined between the billets (46) of the decking (42) and a slot (62) defined between the billets (46) of the runner (44).

9. The method according to claim 8, further including rotating the second leg (76) of the L-clip (70) such that the second leg (76) is substantially parallel with a longitudinal axis of the runners (44).

10. The method according to claim 9, further including;
 disposing U-shaped bolts (80) over a billet, wherein the U-shaped bolts (80) includes a body (82) and two substantially parallel legs (84), and wherein the legs (84) extend between slots (62) defined between adjacent billets (46) and through holes (86) formed in the runners (44); and
 tightening nuts (90) onto distal ends of the legs (846) to urge the decking (42) and the runners (44) together and attaching the decking (42) to the runners (44) and defining the modular engineered wood composite road (40).

11. The method according to claim 10, wherein the assembled modular engineered wood composite road (40) has an axle load strength rating of at least about 8 tons (7258 kg).

12. A method of making a modular engineered wood composite road (100), the method comprising:
 determining a bearing strength of unexcavated soil at a location where a modular engineered wood composite road (100) will be installed;
 determining a flexural strength and stiffness required for the modular engineered wood composite road (100) based on the determined bearing strength of the unexcavated soil at the location where the modular engineered wood composite road (100) will be installed;
 assembling a plurality of engineered wood composite billets (46) from a plurality of composite wood laminations, wherein each engineered wood composite billet (46) has the required flexural strength and stiffness;
 disposing a plurality of timbers (104) on the unexcavated soil and oriented substantially perpendicularly to a direction of traffic flow of vehicles that will travel on the modular engineered wood composite road (100); and attaching the engineered wood composite billets (46) to the plurality of timbers (104) to define the modular engineered wood composite road (100).

13. The method according to claim 12, wherein the assembled modular engineered wood composite road (100) has an axle load strength rating of at least about 8 tons (7258 kg).

14. The method according to claim 13, wherein the timbers (104) are one of solid sawn timbers and engineered wood composite billets.

15. The method according to claim 14, wherein the step of assembling the engineered wood composite billets (46) further includes assembling a runner (102) including the steps of:
 disposing a plurality of spacers (60) between two of the engineered wood composite billets (46);
 disposing a protective edge member (78) on each of the outboard sides of the billets (46), the protective edge member (78) having a rod aperture (78*a*, 78*b*) formed therein;
 inserting a rod (106) through the rod aperture (78*a*, 78*b*) formed in a first one of the protective edge members (78), an aperture (54) formed transversely through a first one of the billets (46), an aperture (61) formed in the spacer (60), an aperture (54) formed transversely through a second one of the billets (46), and the rod aperture (78*a*, 78*b*) formed in a second one of the protective edge members (78), and
 placing nuts (56) on distal ends of the rod (106) and tightening the nuts (56) to form the runner (102).

16. The method according to claim 15, wherein the step attaching the engineered wood composite billets (46) to the plurality of solid sawn timbers (104) to define a modular engineered wood composite road (100) includes laying at least one runner (102) on the solid sawn timbers (104) substantially perpendicularly to the solid sawn timbers (104).

17. The method according to claim 16, further including:
 disposing U-shaped bolts (108) over one of the solid sawn timbers (104), wherein each U-shaped bolts (108) includes a body (110) and two substantially parallel legs (112), wherein the body (110) engages a ground-facing surface of the solid sawn timber (104), and wherein the legs (112) extend through bolt apertures (114) formed in a surface of the protective edge members (78); and
 tightening nuts (116) onto distal ends of the legs (112) to urge the runners (102) and the solid sawn timber (104) together, attaching the runners (102) to the solid sawn timber (104), and defining the modular engineered wood composite road (100).

18. The method according to claim 17, wherein the assembled modular engineered wood composite road (100) has an axle load strength rating of at least about 8 tons (7258 kg).

19. The method according to claim 14, wherein the step of assembling the engineered wood composite billets (46) further includes assembling a runner (102) including the steps of:
 disposing a plurality of spacers (60) between adjacent ones of a plurality of engineered wood composite billets (46);
 disposing a protective edge member (78) on each of the outboard sides of the outboard billets (46), the protective edge member (78) having rod apertures (78*a*, 78*b*) formed therein;
 inserting a rod (106) through each rod aperture (78*a*, 78*b*) formed in a first one of the protective edge members (78), an aperture (54) formed transversely through a first one of the billets (46), an aperture (61) formed in the spacer (60), an aperture (54) formed transversely through a second one of the billets (46), and each rod aperture (78*a*, 78*b*) formed in a second one of the protective edge members (78), and
 placing nuts (56) on distal ends of the rods (106) and tightening the nuts (56) to form the runner (102).

20. A method of making a modular engineered wood composite road (40), the method comprising:
 determining a bearing strength of unexcavated soil at a location where a modular engineered wood composite road (40) will be installed;
 determining a flexural strength and stiffness required for the modular engineered wood composite road (40) based on the determined bearing strength of the unexcavated soil at the location where the modular engineered wood composite road (40) will be installed;
 assembling a plurality of engineered wood composite billets (46) from a plurality of composite wood laminations, the assembly of the plurality of engineered wood composite billets (46) including the steps of:
 assembling a plurality of spacers (60) between adjacent ones of a plurality of the engineered wood composite billets (46) to define a central portion (64) of decking (42); and
 extending a length of chain (68) through apertures (54) formed transversely through the billets (46), and through apertures (61) formed in the spacers (60);
 wherein each engineered wood composite billet (46) has the required flexural strength and stiffness;
 mounting at least one L-clip (70) on each length of chain (68), wherein the L-clip (70) includes an eyelet (72) having a first leg (74) extending radially therefrom and a second leg (76) extending at about a 90 degree angle from the first leg (74), the length of chain (68) extending through the eyelet (72); and
 assembling the engineered wood composite billets (46) on a surface of the unexcavated soil to define the modular engineered wood composite road (40).

\* \* \* \* \*

UNITED STATES PATENT AND TRADEMARK OFFICE
CERTIFICATE OF CORRECTION

| | | |
|---|---|---|
| PATENT NO. | : 10,125,458 B2 | Page 1 of 1 |
| APPLICATION NO. | : 15/535624 | |
| DATED | : November 13, 2018 | |
| INVENTOR(S) | : Fiutak et al. | |

It is certified that error appears in the above-identified patent and that said Letters Patent is hereby corrected as shown below:

On the Title Page (72), please correct the Inventors from:
"Toby Q. Edwards, Bryant, AK (US)"
To:
-- Toby Q. Edwards, Bryant, AR (US) --.

Signed and Sealed this
Fifth Day of February, 2019

Andrei Iancu
*Director of the United States Patent and Trademark Office*